United States Patent
Miwa et al.

(10) Patent No.: US 10,554,093 B2
(45) Date of Patent: Feb. 4, 2020

(54) STATOR OF BRUSHLESS MOTOR, BRUSHLESS MOTOR, AND POWER SLIDING DOOR APPARATUS USING BRUSHLESS MOTOR

(71) Applicant: AISIN SEIKI KABUSHIKI KAISHA, Kariya-shi, Aichi-ken (JP)

(72) Inventors: Nobuyasu Miwa, Ichinomiya (JP); Kiyohiro Fukaya, Takahama (JP); Takemitsu Sumiya, Kariya (JP); Akihiro Yasui, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 330 days.

(21) Appl. No.: 15/702,830

(22) Filed: Sep. 13, 2017

(65) Prior Publication Data
US 2018/0115215 A1 Apr. 26, 2018

(30) Foreign Application Priority Data
Oct. 20, 2016 (JP) ................... 2016-206204

(51) Int. Cl.
*H02K 5/22* (2006.01)
*H02K 1/06* (2006.01)
*H02K 3/46* (2006.01)

(52) U.S. Cl.
CPC .............. *H02K 5/225* (2013.01); *H02K 1/06* (2013.01); *H02K 3/46* (2013.01)

(58) Field of Classification Search
CPC ................... H02K 5/225; H02K 3/46
(Continued)

(56) References Cited

U.S. PATENT DOCUMENTS

| 7,663,287 B2* | 2/2010 | Haga ............... H02K 3/325 310/260 |
| 2006/0244323 A1* | 11/2006 | Hatano ............... F16K 31/04 310/80 |

(Continued)

FOREIGN PATENT DOCUMENTS

| CN | 101682225 A | 3/2010 |
| CN | 201533207 U | 7/2010 |

(Continued)

OTHER PUBLICATIONS

Communication dated May 17, 2019 from the State Intellectual Property Office of the P.R.C. in application No. 201710821622.4.

*Primary Examiner* — Gary A Nash
(74) *Attorney, Agent, or Firm* — Sughrue Mion, PLLC (57) ABSTRACT

A stator of a brushless motor includes: a stator core; a coil that is formed by winding a conducting wire around the stator core; a connecting terminal that is electrically connected to an end portion of the coil; and a terminal fixing base that has an electrical insulation property, is attached to an end portion of the stator core on one side in an axial direction thereof, and fixes the connecting terminal. The connecting terminal includes a fixing portion that is fixed to the terminal fixing base, an outward projecting portion that extends from the fixing portion toward outside in a radial direction than the stator core, and a joining portion that overlaps with the outward projecting portion in the axial direction and is positioned outside the stator core in the radial direction. The joining portion is opened outward in the radial direction.

9 Claims, 7 Drawing Sheets

(58) Field of Classification Search
USPC .................................................. 310/68 R, 71
See application file for complete search history.

(56) References Cited

U.S. PATENT DOCUMENTS

| 2009/0058215 | A1* | 3/2009 | Murakami | ............. | H02K 3/522 |
| | | | | | 310/208 |
| 2013/0309918 | A1* | 11/2013 | Nakamura | ............. | H02K 3/522 |
| | | | | | 439/877 |

FOREIGN PATENT DOCUMENTS

| JP | 2008-263783 A | 10/2008 |
| JP | 2014-128118 A | 7/2014 |

* cited by examiner

STATOR OF BRUSHLESS MOTOR, BRUSHLESS MOTOR, AND POWER SLIDING DOOR APPARATUS USING BRUSHLESS MOTOR

CROSS REFERENCE TO RELATED APPLICATIONS

This application is based on and claims priority under 35 U.S.C. § 119 to Japanese Patent Application 2016-206204, filed on Oct. 20, 2016, the entire contents of which are incorporated herein by reference.

TECHNICAL FIELD

This disclosure relates to a stator of a brushless motor, a brushless motor, and a power sliding door apparatus using the brushless motor.

BACKGROUND DISCUSSION

In the related art, there has been known a brushless motor in which a connecting terminal that is electrically connected to a winding-start end portion or a winding-finish end portion of a drive coil is provided on an insulator of a stator. For example, JP 2014-128118A (Reference 1) discloses a brushless motor (electric motor) in which a circuit board is disposed to face a stator in an axial direction thereof via a gap on one side of the stator in the axial direction, and a connecting terminal is provided between an insulator and the circuit board in the axial direction. The connecting terminal is provided with a board connecting portion that is connected to the circuit board, an arm portion that extends further toward one side than the board connecting portion in a circumferential direction, and a joining portion that is provided at a distal portion of the arm portion and is joined with an end portion of a drive coil. The joining portion is positioned further inward in a radial direction than an outer edge of a stator core in the radial direction. Therefore, the joining portion is positioned between the stator core and the circuit board in the axial direction.

Incidentally, in the brushless motor of Reference 1, it is necessary to provide a space for positioning the joining portion between the insulator and the circuit board in the axial direction, and thus it is difficult for the circuit board to approach the stator in the axial direction. Therefore, there is room for improvement in miniaturization of the brushless motor in the axial direction. Such a problem may also arise in a configuration in which a connecting terminal is fixed to a terminal base that is formed separately from the insulator.

Thus, a need exists for a stator of a brushless motor, a brushless motor, and a power sliding door apparatus using the brushless motor which are not susceptible to the drawback mentioned above.

SUMMARY

A stator of a brushless motor according to an aspect of this disclosure includes: a stator core; a coil that is formed by winding a conducting wire around the stator core; a connecting terminal that is electrically connected to an end portion of the coil; and a terminal fixing base that has an electrical insulation property, is attached to an end portion of the stator core on one side in an axial direction thereof, and fixes the connecting terminal. The connecting terminal includes a fixing portion that is fixed to the terminal fixing base, an outward projecting portion that extends from the fixing portion toward outside in a radial direction than the stator core, and a joining portion that overlaps with the outward projecting portion in the axial direction and is positioned outside the stator core in the radial direction. The joining portion is opened outward in the radial direction.

A brushless motor according to an aspect of this disclosure includes: the stator of a brushless motor described above; and a circuit board that is disposed on one side of the stator in the axial direction.

A power sliding door apparatus according to an aspect of this disclosure includes: the brushless motor described above as a drive source that actuates a sliding door of a vehicle to be opened and closed. The axial direction of the brushless motor is disposed to be parallel to a vehicle width direction of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

With reference to FIGS. 1 to 11, an embodiment of a brushless motor as a drive source of a power sliding door apparatus is described.

Figure 1:
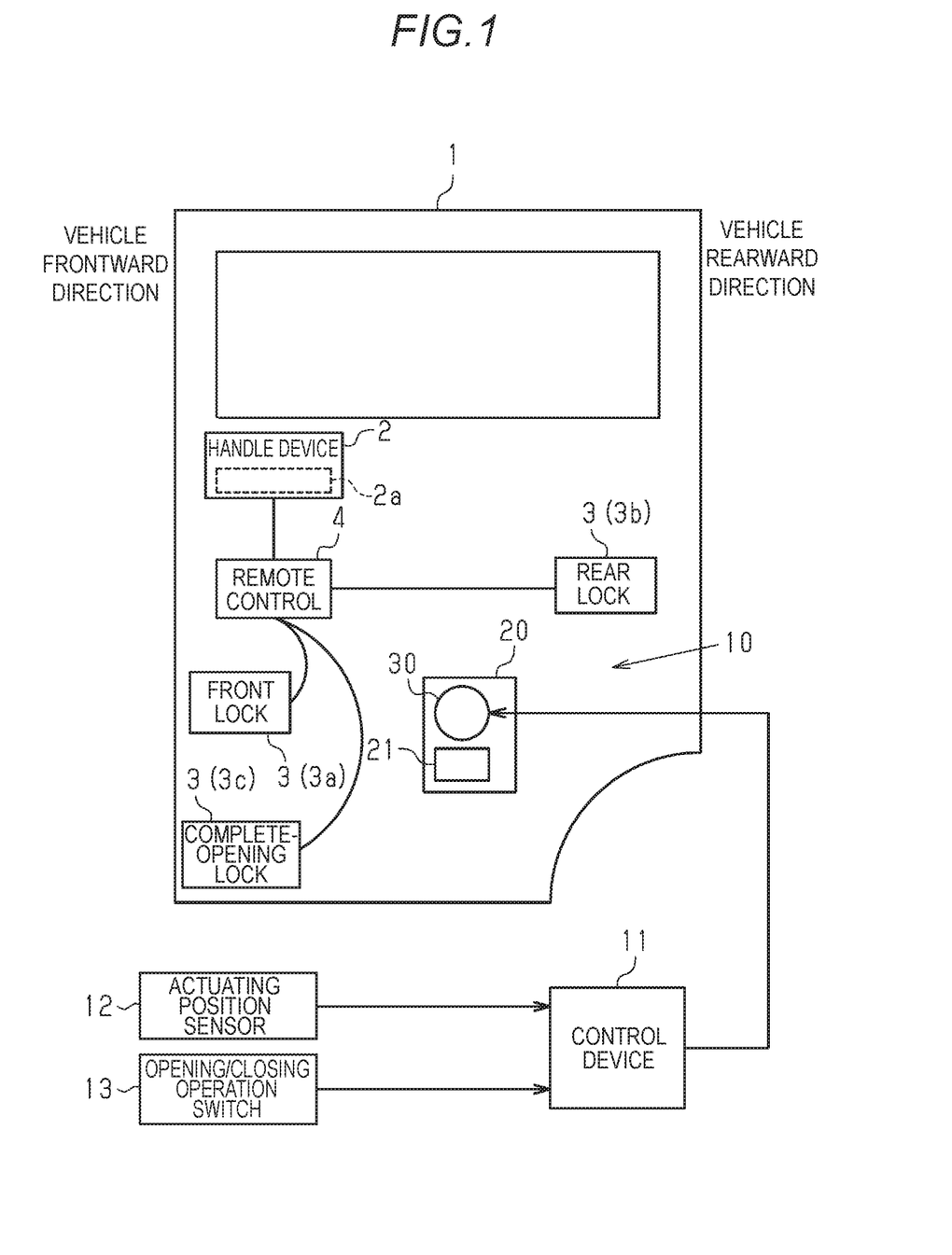
FIG. 1 is a schematic configuration diagram of a power sliding door apparatus.

As illustrated in FIG. 1, a sliding door 1 provided in a vehicle is configured to open and close an opening (not illustrated) provided in a body side surface of the vehicle by moving in a vehicle frontward-rearward direction. Specifically, the sliding door 1 moves toward the front side of the vehicle, thereby entering into a closed state of blocking the opening of the body, and moves toward the rear side of the vehicle, thereby entering into an opened state in which it is possible to enter and exit the vehicle through the opening of the body.

The sliding door 1 is provided with a handle device 2 that is operated to open and close the sliding door 1 and three locking mechanisms 3 for restricting the sliding door 1. The locking mechanisms 3 include a front lock 3a and a rear lock 3b for restricting the sliding door 1 at a completely closed position and a complete-opening lock 3c for restricting the sliding door 1 at a completely opened position. The locking mechanisms 3a to 3c are each mechanically connected to the handle device 2 via a transmission member such as a wire extending from a remote control 4.

An operation force input to the handle device 2 is transmitted to each of the locking mechanisms 3a to 3c, based on the movement of an operation unit (an outer handle and an inner handle) 2a provided on an exterior surface and an interior surface of the sliding door 1. Then, restriction of the sliding door 1 is canceled, based on the operation force, and thereby the sliding door 1 at the completely closed position is allowed to move in an opening direction, or the sliding door 1 at the completely opened position is allowed to move in a closing direction.

Also, the vehicle is provided with a power sliding door apparatus 10 that has an electric actuator 20 including a brushless motor 30 as a drive source and is capable of causing the sliding door 1 to perform an opening/closing operation.

The brushless motor 30 rotates based on drive power supplied by a control device 11. In other words, the electric actuator 20 controls such actuation with the drive power supplied by the control device 11. In addition, the electric actuator 20 includes a decelerating mechanism 21 that performs outputting to decelerate rotation of the brushless motor 30. In such a configuration, rotation of the brushless motor 30 which is decelerated by the decelerating mechanism 21 is transmitted to a drive unit (not illustrated) of the sliding door 1, and thereby the sliding door 1 performs the opening/closing operation.

An actuating position sensor 12 that detects opened/closed positions of the sliding door 1 is connected to the control device 11. In addition, in the control device 11, an opening/closing operation switch 13 provided in the handle device 2 or a portable device (remote control key), inside the vehicle interior, or the like is operated, and thereby an actuation request signal of requesting actuation of the sliding door 1 by the electric actuator 20 is input. The control device 11 controls the actuation of the electric actuator 20 such that the sliding door 1 performs the opening/closing operation or stops, based on the actuation request signal and the opened/closed position of the sliding door 1.

Next, a configuration of the electric actuator 20 will be described.

Figure 2:
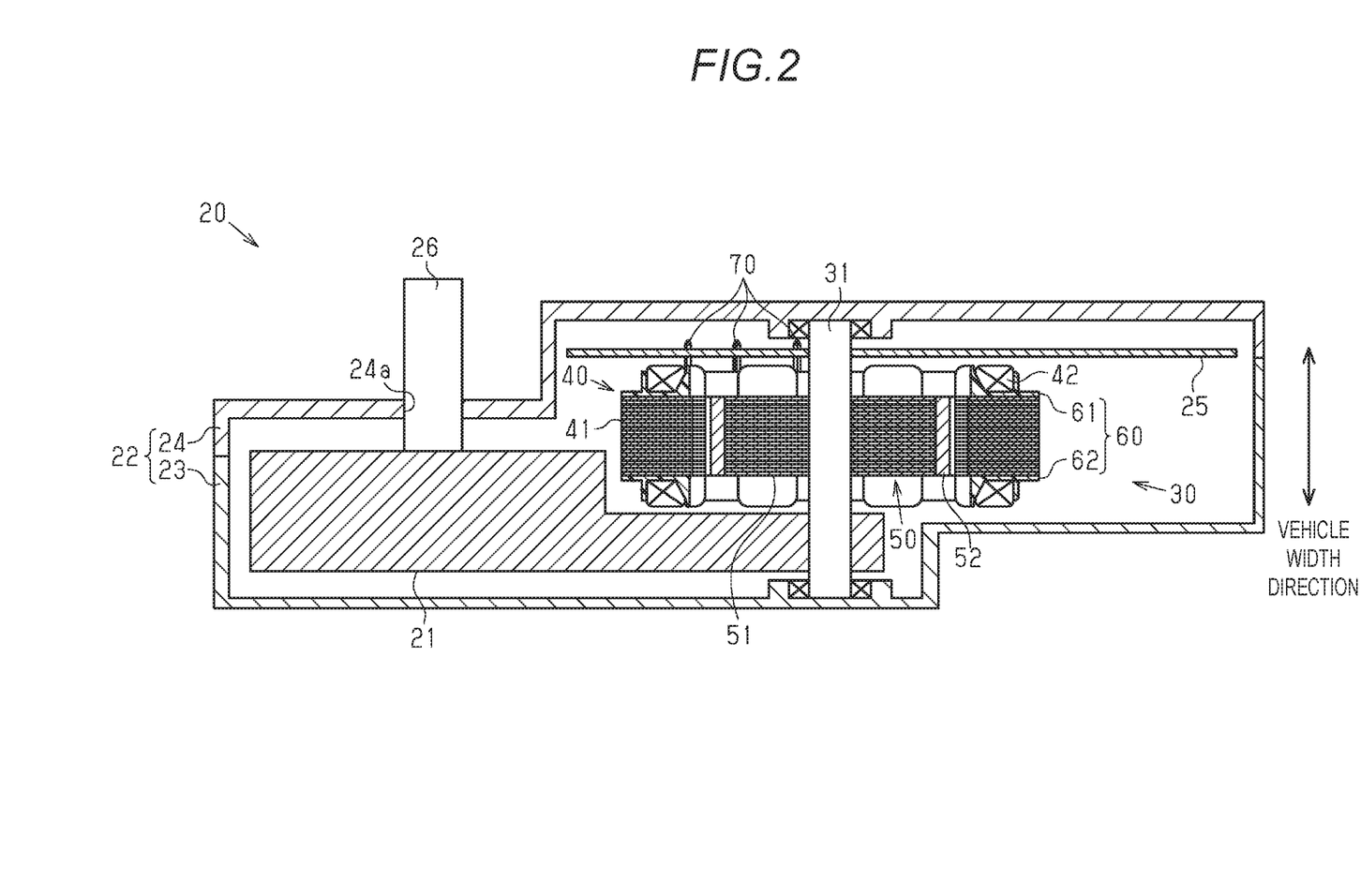
FIG. 2 is a sectional view of a plane obtained by cutting an electric actuator in an axial direction.

As illustrated in FIG. 2, the electric actuator 20 includes a housing 22 having a flat box shape in which the brushless motor 30 and the decelerating mechanism 21 are accommodated. The housing 22 is formed by assembling a first housing member 23 and a second housing member 24. The housing 22 accommodates a circuit board 25 that controls the brushless motor 30 inside.

The brushless motor 30 is an inner rotor type motor that includes a stator 40 fixed to the first housing member 23 and a rotor 50 that rotates integrally with a rotary shaft 31 on the inner side of the stator 40. In the following description, an "axial direction" indicates a direction parallel to a direction in which the rotary shaft 31 extends, a "radial direction" indicates a direction orthogonal to the axial direction, and a "circumferential direction" indicates a direction parallel to a direction around a central axis of the rotary shaft 31.

The rotary shaft 31 is supported to be rotatable with respect to the housing 22. The rotary shaft 31 extends to be parallel to a vehicle width direction. In other words, the brushless motor 30 is provided in a body of a vehicle such that the axial direction is parallel to the vehicle width direction. The decelerating mechanism 21 is configured to have one or a plurality of disc-shaped gears that mesh, with the rotary shaft 31 as an input unit. The decelerating mechanism 21 is provided with an output shaft 26 that projects outside the housing 22 through a through-hole 24a formed in the second housing member 24. The output shaft 26 is directly or indirectly connected to a drive unit of the sliding door 1 (refer to FIG. 1). The brushless motor 30 may be provided in a body of a vehicle such that the axial direction is disposed to be parallel to a vertical direction of the vehicle.

The rotor 50 includes a rotor core 51 fixed to the rotary shaft 31. The rotor core 51 has a configuration in which magnetic steel sheets formed to have a disc shape are stacked in the axial direction. A ring-shaped permanent magnet 52 is fixed to an outer circumferential surface of the rotor core 51 with an adhesive. The permanent magnet 52 has eight magnetic poles of N poles and S poles in the circumferential direction. The number of magnetic poles of the permanent magnet 52 is an optional setting item.

The stator 40 includes a stator core 41 having a configuration in which magnetic steel sheets are stacked in the axial direction and a plurality of drive coils 42 to which three-phase drive power for rotating the rotor 50 is supplied. The plurality of drive coils 42 of the embodiment are connected by star connection. On one side of the stator 40 in the axial direction, the circuit board 25 is disposed to have a gap from the plurality of drive coils 42 in the axial direction. The circuit board 25 is disposed to face the stator 40 in the axial direction and to cover the stator 40 from the one side in the axial direction. The circuit board 25 has a configuration in which a plurality of electronic parts are mounted on a board main body formed to have a flat plate shape having a main surface along a flat plane parallel to the radial direction. The circuit board 25 is supported by the stator 40 and a support 23a (refer to FIG. 11) of the first housing member 23. In the following description, a side on which the circuit board 25 is positioned with respect to the stator 40 in the axial direction is referred to as a "one side in the axial direction", and an opposite side to the side on which the circuit board 25 is positioned with respect to the stator 40 in the axial direction is referred to as a "the other side in the axial direction".

Figure 3:
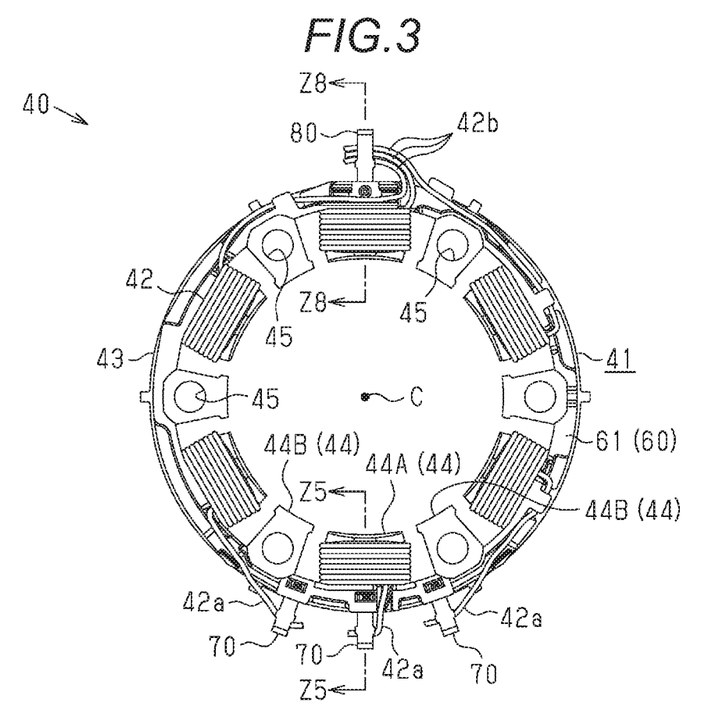
FIG. 3 is a plan view of a stator of a brushless motor.

As illustrated in FIG. 3, the stator core 41 includes a substantially annular core back 43 that surrounds the rotor 50, and a plurality of teeth 44 that extend radially inward in the radial direction from the core back 43. End portions of the plurality of teeth 44 on the inner side in the radial direction face the outer circumferential surface of the permanent magnet 52 (refer to FIG. 2). The number of teeth 44 is an optional setting item.

The plurality of teeth 44 includes first teeth 44A having the drive coil 42 formed by concentrated winding of a conducting wire around the teeth 44, and second teeth 44B without the drive coil 42 formed around the teeth 44. The first teeth 44A and the second teeth 44B are alternately disposed in the circumferential direction. In this manner, a magnetic circuit is formed by flowing magnetic flux through one side of the N poles and the S poles of the permanent magnet 52 facing the inner circumferential surfaces of the first teeth 44A, the first teeth 44A, the core back 43, the second teeth 44B adjacent to the first teeth 44A, and the other side of the N poles and the S poles of the permanent magnet 52 facing the inner circumferential surfaces of the second teeth 44B.

A portion of the second teeth 44B on the outer side in the radial direction is provided with a through-hole 45 that penetrates through the second teeth 44B in the axial direction. It is possible for the through-hole 45 to be used as a portion for positioning the stator 40 with respect to the first housing member 23 when the stator 40 is positioned in the first housing member 23 (refer to FIG. 2). Also, a screw (not illustrated) is inserted into the through-hole 45 to be screwed into the first housing member 23, and thereby it is possible to fix the stator 40 to the first housing member 23. In this way, since a structure in which the stator 40 is fixed to the first housing member 23 in the stator core 41 is provided, it is possible to achieve miniaturization of the brushless motor 30 in the radial direction, compared to a case where a structure in which the stator 40 is fixed to the first housing member 23 on the outer side of the stator core 41 in the radial direction is provided.

A resin insulator 60 having an electrical insulation property is mounted on the stator core 41. The insulator 60 is interposed between the stator core 41 and the drive coil 42, thereby electrically insulating the stator core 41 and the drive coil 42. The insulator 60 covers both end surfaces of the core back 43 in the axial direction, a surface thereof on the inner side in the radial direction, both end surfaces of the first teeth 44A in the axial direction, and side surfaces thereof in the circumferential direction. As illustrated in FIG. 2, the insulator 60 includes a first insulator 61 and a second insulator 62 which are divided in the axial direction. The first insulator 61 is directly attached to the stator core 41 on the one side in the axial direction, and the second insulator 62 is directly attached to the stator core 41 on the other side in the axial direction. The first insulator 61 is an example of a "terminal fixing base".

Figure 4:
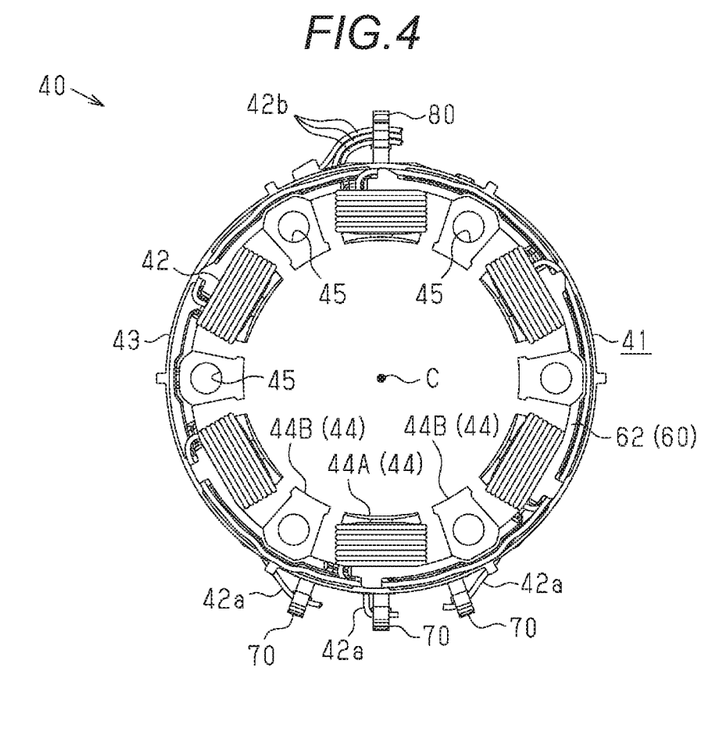
FIG. 4 is a bottom view of the stator in FIG. 3.

As illustrated in FIGS. 3 and 4, the drive coils 42 of each phase are each configured of two drive coils 42 formed around the first teeth 44A which are separated in the circumferential direction by 180°. The drive coils 42 of each phase are formed of one conducting wire. As illustrated in FIG. 4, on the second insulator 62, a conducting wire continued from one drive coil 42 to the other drive coil 42 of the drive coils 42 of each phase is drawn about. In this manner, as illustrated in FIG. 3, the drive coils 42 of each phase have a first end portion 42a that is electrically connected to the circuit board 25 such that the drive power is supplied, and a second end portion 42b that forms a neutral point. The first end portions 42a and the second end portions 42b are gathered to be positioned on opposite sides from each other with respect to the center C of the stator 40. The first end portion 42a is one end portion of a winding-start end portion and a winding-finish end portion of the drive coils 42 of each phase and the second end portion 42b is the other end portion of the winding-start end portion and the winding-finish end portion of the drive coils 42 of each phase.

The first insulator 61 is provided with three first connecting terminals 70 for electrically connecting each of the drive coils 42 of three phases and the circuit board 25, and one second connecting terminal 80 for configuring the neutral point of the drive coils 42 of each phase. The first insulator 61, the three first connecting terminals 70, and the second connecting terminal 80 are subjected to insert molding. As illustrated in FIGS. 3 and 4, the three first connecting terminals 70 and the second connecting terminal 80 are disposed to be positioned on opposite sides from each other with respect to the center C of the stator 40. In this way, the first end portions 42a of the drive coils 42 are positioned on the three first connecting terminals 70 side with respect to the center C of the stator 40, and the second end portions 42b of the drive coils 42 are positioned on the second connecting terminal 80 side with respect to the center C of the stator 40.

The three first connecting terminals 70 are disposed in a range that is defined by a space between the second teeth 44B in the circumferential direction which are adjacent on both sides of the one first tooth 44A in the circumferential direction. Specifically, the first connecting terminal 70 at the center in the circumferential direction is disposed at the same position as that of the one first tooth 44A in the circumferential direction, and the first connecting terminals 70 on both sides in the circumferential direction are disposed to be closer to the one first tooth 44A in the circumferential direction between the second teeth 44B adjacent to the one tooth 44A.

A drawing-out groove 61a (refer to FIG. 11) extending in the radial direction is formed on one side of portions adjacent to a portion of the first insulator 61 in the circumferential direction in which the first connecting terminal 70 at the center in the circumferential direction is positioned. In the drawing-out groove 61a, the first end portion 42a of the drive coil 42 formed around the one first tooth 44A is accommodated. The first end portion 42a is drawn toward outside in the radial direction than the first insulator 61 through the drawing-out groove 61a.

Figure 5A:
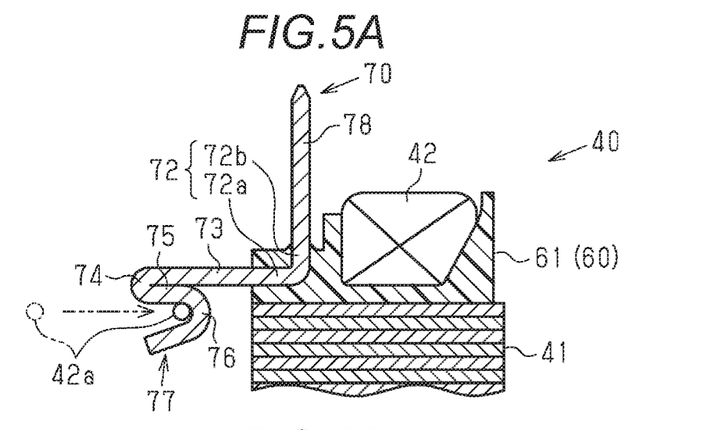
FIG. 5A is a sectional view taken along line Z5-Z5 in FIG. 3.
Figure 5B:
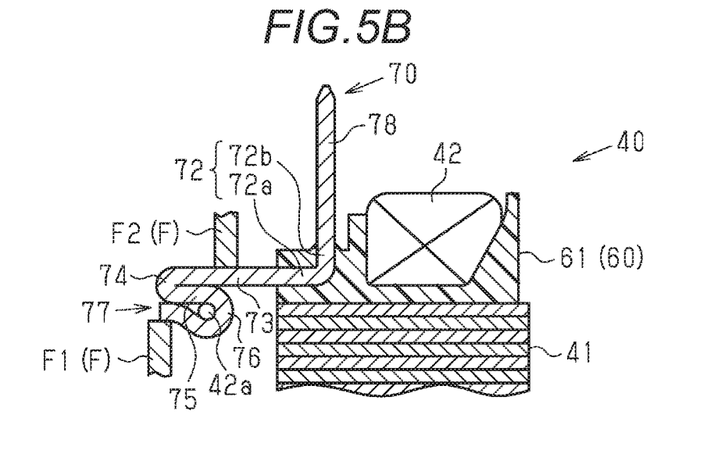
FIG. 5B is a sectional view taken along line Z5-Z5 after fusing of a first connecting terminal.
Figure 6A:
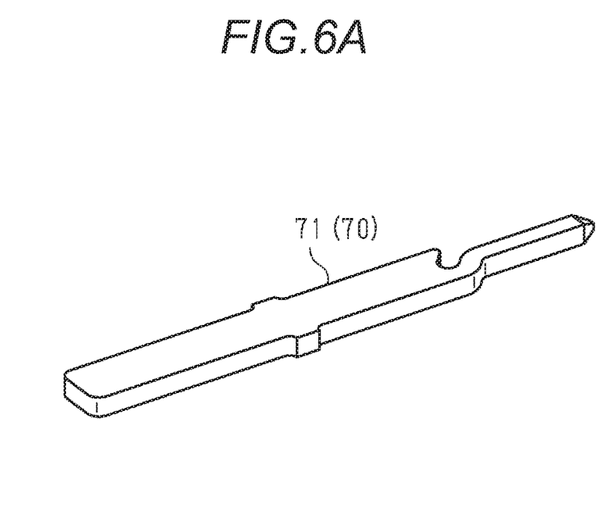
FIG. 6A is a perspective view before the first connecting terminal is folded back.
Figure 6B:
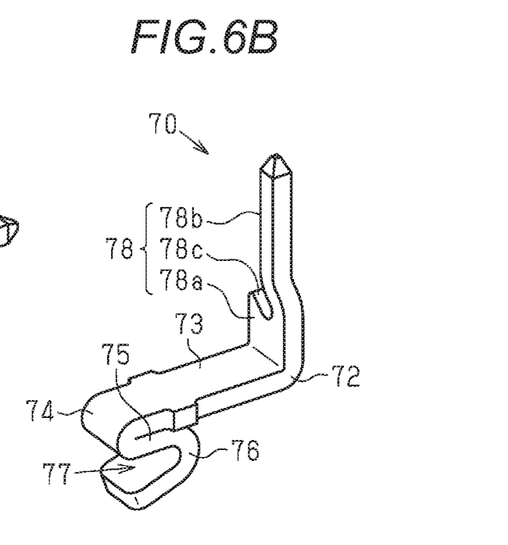
FIG. 6B is a perspective view of the first connecting terminal.

As illustrated in FIG. 6A, the first connecting terminal 70 is formed by folding back, in a plate thickness direction, a base material 71 punched as a linear plate material out from a metal plate. As illustrated in FIGS. 5A to 6B, the first connecting terminal 70 is configured to have a fixing portion 72, an outward projecting portion 73, a first bent portion 74, a folded portion 75, a second bent portion 76, a joining portion 77, and a board connecting portion 78.

The fixing portion 72 is a portion that is fixed to the first insulator 61. The fixing portion 72 is formed to have an L shape having a first portion 72a and a second portion 72b. The first portion 72a is a portion that extends in the radial direction in a state in which the first connecting terminal 70 is fixed to the first insulator 61. The second portion 72b is a portion that extends toward the one side (side on which the circuit board 25 in FIG. 2 is disposed with respect to the stator 40) in the axial direction in a state in which the first connecting terminal 70 is fixed to the first insulator 61. The outward projecting portion 73 extends toward outside in the radial direction from an end portion of the first portion 72a of the fixing portion 72 on the outer side in the radial direction. The outward projecting portion 73 projects toward outside in the radial direction from the first insulator 61 in a state in which the first connecting terminal 70 is fixed to the first insulator 61, and the outward projecting portion projects toward outside in the radial direction than the stator core 41. The first bent portion 74 is folded back to have 180° from the end portion of the outward projecting portion 73 on the outer side in the radial direction toward the other side in the axial direction and the inner side in the radial direction. The folded portion 75 extends inward in the radial direction from the first bent portion 74. The folded portion 75 is in contact with the outward projecting portion 73 in the axial direction. The second bent portion 76 is folded back to have about 180° from the end portion of the folded portion 75 on the inner side in the radial direction toward the other side in the axial direction and the outer side in the radial direction. The joining portion 77 is provided with a portion that extends toward outside in the radial direction from the second bent portion 76 and is a portion to which the first end portion 42a of the drive coil 42 is joined between the folded portion 75 and the joining portion. The joining portion 77 overlaps with the outward projecting portion 73 in the axial direction. The joining portion 77 is opened outward in the radial direction. In addition, the joining portion 77 is also opened on both sides in the circumferential direction.

The board connecting portion 78 is a portion that extends from the end portion of the second portion 72b of the fixing portion 72 on the one side in the axial direction toward the one side in the axial direction, thereby projecting from the first insulator 61 toward the one side in the axial direction. The board connecting portion 78 is inserted into the circuit board 25 (refer to FIG. 2) and is mechanically and electrically connected to the circuit board 25 by soldering. The board connecting portion 78 is configured to have a base portion 78a, a connecting portion 78b, and a notch 78c. The base portion 78a is a portion of the board connecting portion 78 on the fixing portion 72 side (the other side in the axial direction). The connecting portion 78b has a width narrower than a width of the base portion 78a and extends toward the one side in the axial direction from an end portion of the base portion 78a on the one side in the axial direction. The notch 78c is formed in the end portion of the base portion 78a on the one side in the axial direction.

The first end portion 42a of the drive coil 42 is joined to the joining portion 77 as follows. In other words, as illustrated in FIG. 5A, the first end portion 42a of the drive coil 42 is drawn toward outside in the radial direction than the stator core 41 by a coil winding nozzle (not illustrated) of a coil winding machine, and then moves inward in the radial direction, thereby being inserted into the joining portion 77 of the first connecting terminal 70 from the outer side in the radial direction. The first end portion 42a maintains a state of being pressed inward in the radial direction in the joining portion 77. Therefore, the tension of the first end portion 42a is reduced, and thereby an occurrence of loosening of the first end portion 42a is reduced.

Next, an opening in the joining portion 77 which is opened outward in the radial direction is closed by fusing. Specifically, as illustrated in FIG. 5B, a first welding electrode F1 of a fusing device F comes into contact with a surface of the outward projecting portion 73 on the one side in the axial direction, and a current flows from the first welding electrode F1 to a second welding electrode F2 in a state in which the second welding electrode F2 comes into contact with an end surface of the joining portion 77 on the other side in the axial direction and is pressurized toward the one side in the axial direction. At this time, since the joining portion 77 is heated and is pressurized toward the one side in the axial direction, the joining portion 77 softens and the opening of the joining portion 77 which is opened outward in the radial direction is closed. A method of joining the joining portion 77 with the first end portion 42a of the drive coil 42 may be a method other than fusion welding of melting and joining the joining portion 77 and the first end portion 42a with each other or fusing like brazing of melting an alloy (wax) having a melting point lower than that of the joining portion 77 or the first end portion 42a and joining the joining portion 77 and the first end portion 42a.

Figure 7:
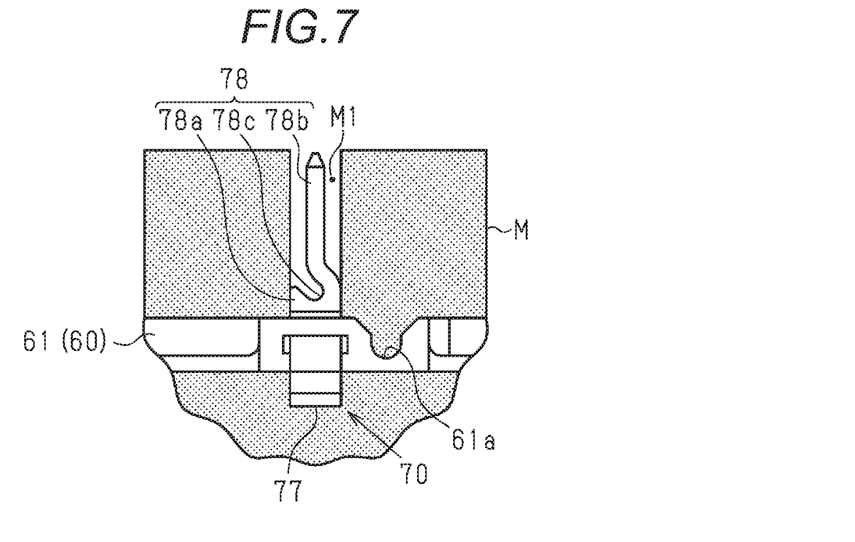
FIG. 7 is a sectional view of a mold when a first insulator and a first connecting terminal of the stator are subjected to insert molding.

As illustrated in FIG. 7, the first connecting terminal 70 is disposed to be accommodated in a partial portion M1 of a mold M when the first insulator 61 is formed through the insert molding. Although not illustrated in FIG. 7, similarly, the other two first connecting terminals 70 are disposed to be accommodated in a partial portion M1 of the mold M.

Figure 8A:
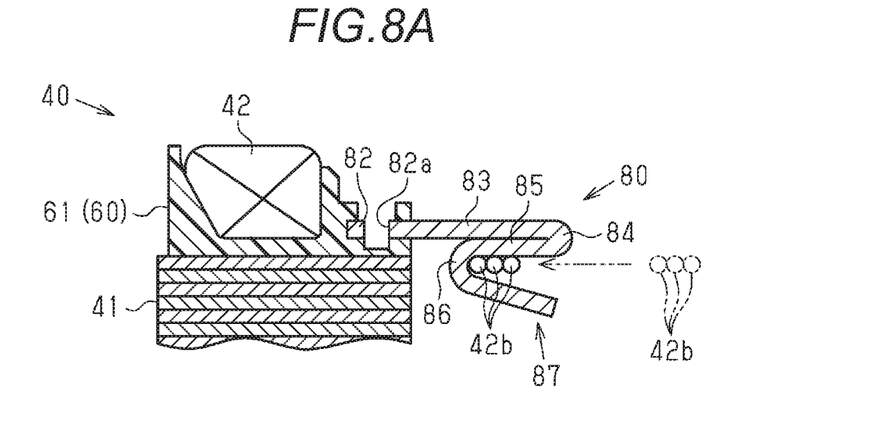
FIG. 8A is a sectional view taken along line Z8-Z8 in FIG. 3.
Figure 8B:
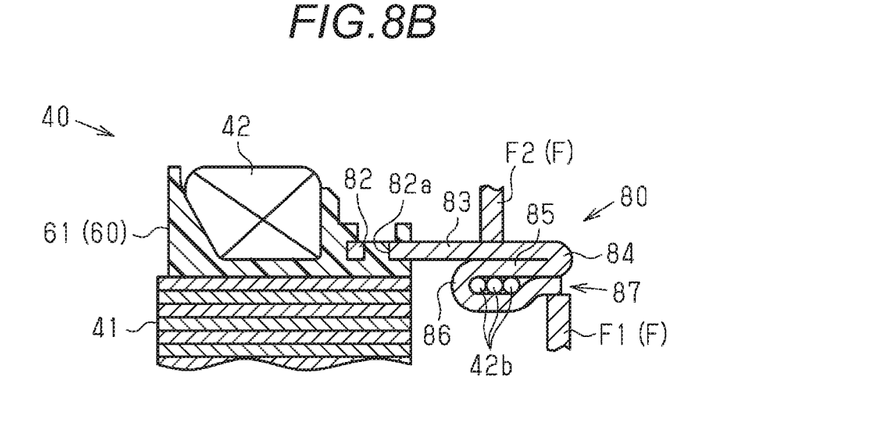
FIG. 8B is a sectional view taken along line Z8-Z8 after fusing of a second connecting terminal.
Figure 9A:
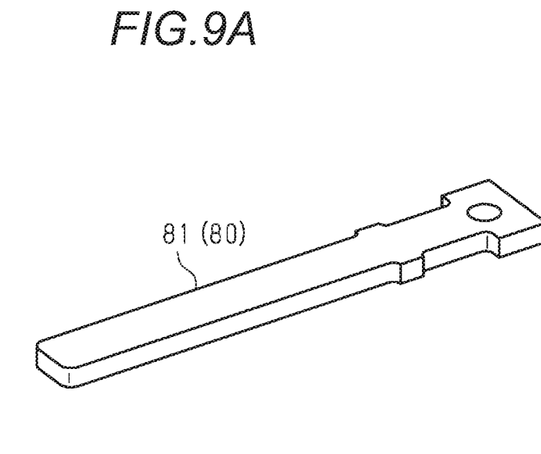
FIG. 9A is a perspective view before the first connecting terminal is folded back.

As illustrated in FIG. 9A, the second connecting terminal 80 is formed by folding back, in a plate thickness direction, a base material 81 punched as a linear plate material out from a metal plate. As illustrated in FIGS. 8A to 9B, the second connecting terminal 80 is configured to have a fixing portion 82, an outward projecting portion 83, a first bent portion 84, a folded portion 85, a second bent portion 86, and a joining portion 87.

Figure 9B:
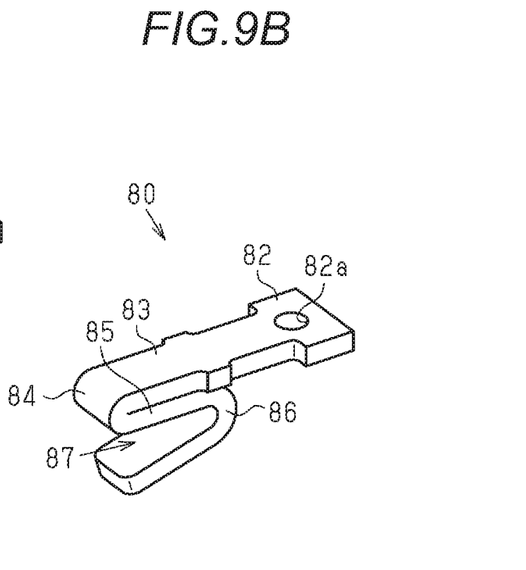
FIG. 9B is a perspective view of the second connecting terminal.

The fixing portion 82 is a portion that is fixed to the first insulator 61 and is formed to have a flat plate shape that extends in the radial direction. The fixing portion 82 is provided with a through-hole 82a through which a positioning member (not illustrated) of the mold M is inserted during the insert molding with the first insulator 61. The outward projecting portion 83 extends toward outside in the radial direction from an end portion of the fixing portion 82 on the outer side in the radial direction. The outward projecting portion 83 projects toward outside in the radial direction from the first insulator 61 and projects toward outside in the radial direction than the stator core 41. The first bent portion 84, the folded portion 85, the second bent portion 86, and the joining portion 87 have the same configurations as those of the first bent portion 74, the folded portion 75, the second bent portion 76, and the joining portion 77 of the first connecting terminal 70.

As illustrated in FIG. 8A, a method of inserting the second end portion 42b of the drive coil 42 into the joining portion 87 of the second connecting terminal 80 is the same as the method of inserting the first end portion 42a of the drive coil 42 into the joining portion 77 of the first connecting terminal 70 except that the second end portion 42b is three conducting wires. In addition, as illustrated in FIG. 8B, the fusing method of the second connecting terminal 80 is the same as the fusing method of the first connecting terminal 70. When the second connecting terminal 80 is fused, the first insulator 61 on the periphery of the second connecting terminal 80 is melted by heat of the second connecting terminal 80, and thereby the through-hole 82a is buried by the first insulator 61.

Figure 10:
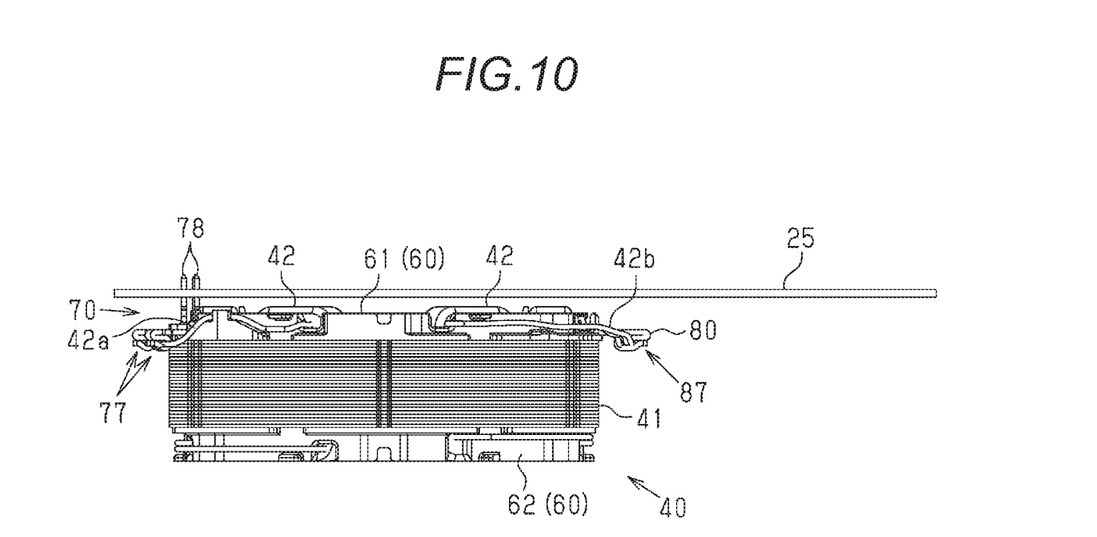
FIG. 10 is a side view of the stator and a circuit board.

As illustrated in FIG. 10, on one side of the stator 40 in the axial direction, the circuit board 25 is disposed via a slight gap from the drive coils 42 in the axial direction. The joining portions 77 and the joining portion 87 are disposed to overlap with the end portion of the stator core 41 on the one side in the axial direction when the stator 40 is viewed in the radial direction. In other words, the joining portions 77 and the joining portion 87 are disposed close to the other side in the axial direction than a portion of the first insulator 61 which covers the stator core 41 from the one side in the axial direction when the stator 40 is viewed in the radial direction. In addition, as described above, the joining portions 77 and the joining portion 87 are positioned outside the stator core 41 and the first insulator 61 in the radial direction. In this way, since the joining portions 77 and the joining portion 87 are not disposed in a space between the first insulator 61 and the circuit board 25 in the axial direction, it is possible to reduce a distance between the stator 40 and the circuit board 25 in the axial direction.

Figure 11:
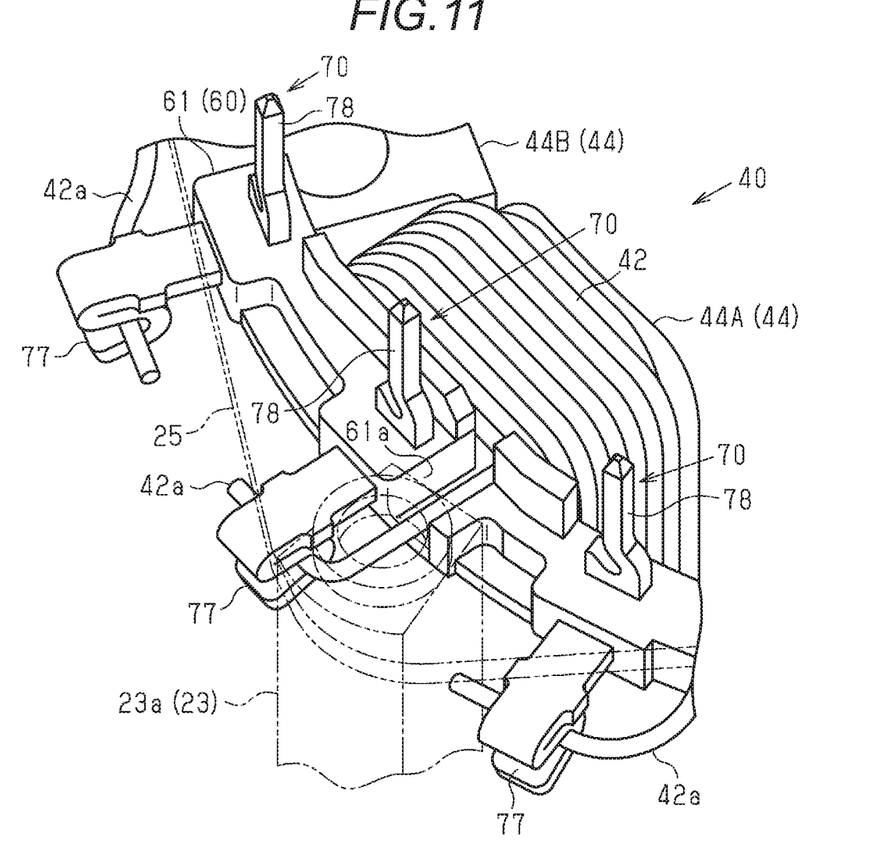
FIG. 11 is a perspective view of the stator in the vicinity of the first connecting terminal.

With reference to FIG. 11, effects of the embodiment are described.

The power sliding door apparatus 10 (refer to FIG. 1) is provided in the sliding doors 1 of both side portions of the body of the vehicle in some cases. In this case, the electric actuator 20 (refer to FIG. 2) has a mirror copy structure. Therefore, the housing 22 (refer to FIG. 2) of the electric actuator 20 has a mirror copy shape in side portions of the body of the vehicle. In other words, since shapes of the housing 22 in the sliding doors 1 in both side portions are different from each other, it is not possible to use, as common parts, the housings 22 in the sliding door 1 on both side portions. Meanwhile, it is preferable that the rotor 50 and the stator 40 of the brushless motor 30 accommodated in the housing 22 are used as common parts, because costs of the electric actuator 20 are reduced.

Incidentally, as illustrated in FIG. 11, the support 23a of the first housing member 23 supports corners of the circuit board 25. The support 23a and the circuit board 25 are fixed with a screw (not illustrated). In this manner, since an occurrence of micro-vibration of the circuit board 25 is reduced, a force is less applied to a solder portion of the board connecting portion 78 of the first connecting terminals 70 and the circuit board 25.

The support 23a is positioned in the circumferential direction between the first connecting terminal 70 at the center and the first connecting terminal 70 on the one side (right front side of the page) in the circumferential direction due to space restriction of the electric actuator 20. Although not illustrated, in the first housing member 23 having a mirror copy structure, the position of the support 23a is different, and the first connecting terminal 70 at the center is positioned between the first connecting terminals 70 in the circumferential direction on the other side (left rear side of the page) in the circumferential direction.

Further, a space in the circumferential direction in which the three first connecting terminals 70 are disposed is limited due to the space restriction of the electric actuator 20. Therefore, in the limited space in the circumferential direction, it is necessary to secure a space in the circumferential direction between the first connecting terminal 70 at the center and the first connecting terminal 70 on the one side (right front side of the page) in the circumferential direction, and a space in the circumferential direction between the first connecting terminal 70 at the center and the first connecting terminal 70 on the other side (left rear side of the page) in the circumferential direction.

In the embodiment, the first connecting terminals 70 are provided with the joining portion 77 by being folded back in the plate thickness direction. In this manner, since the outward projecting portion 73 and the joining portion 77 overlap with each other when viewed in the axial direction, it is possible to achieve space saving in the circumferential direction of a portion of the first connecting terminal 70 that projects toward outside in the radial direction than the stator core 41, compared to a configuration in which the position of the outward projecting portion in the circumferential direction and the position of the joining portion in the circumferential direction are different. In this manner, it is possible to secure a large space between the two adjacent first connecting terminals 70 in the circumferential direction, and it is possible to use a common stator 40 even when the positions of the supports 23a of the first housing members 23 in both sliding doors are different because the electric actuator has the mirror copy structure. Hence, it is possible to reduce costs of the power sliding door apparatus 10 (refer to FIG. 1).

According to the embodiment, it is possible to achieve the following effects.

(1) Since the joining portion 77 of the first connecting terminal 70 is positioned outside the stator core 41 in the radial direction, the joining portion 77 avoids being positioned between the stator core 41 and the circuit board 25 in the axial direction. Hence, it is possible to cause the circuit board 25 to approach the stator 40, and thus it is possible to achieve miniaturization of the brushless motor 30 in the axial direction.

In addition, since the joining portion 77 is opened outward in the radial direction, that is, since the joining portion 77 is not opened inward in the radial direction, the first end portion 42a of the drive coil 42 is caught in the portion of the joining portion 77 on the inner side in the radial direction, and thereby the tension is applied to the first end portion 42a. In this manner, it is possible to easily reduce an occurrence of the loosening of the first end portion 42a. Hence, it is possible to easily join the first end portion 42a to the joining portion 77. Since the joining portion 87 of the second connecting terminal 80 and the joining portion 77 of the first connecting terminal 70 have the same configuration, the same effects are also obtained by the joining portion 87 of the second connecting terminal 80.

(2) The first connecting terminal 70 is formed by folding back the base material 71 as the flat plate-like plate in the plate thickness direction. Therefore, the joining portion 77 is formed on a surface of the base material 71 which is orthogonal to a surface thereof in the plate thickness direction thereof, and thus it is possible to obtain a large contact area between the first end portion 42a of the drive coil 42 and the joining portion. Hence, it is possible to enhance the reliability of electrical connection between the first end portion 42a and the joining portion 77.

Also, since the joining portion 77 is opened on the outer side in the radial direction and both sides in the circumferential direction, as illustrated in FIG. 5A, it is easy to insert the first end portion 42a of the drive coil 42 from the outer side of the joining portion 77 in the radial direction. Hence, it is possible to easily join the first end portion 42a to the joining portion 77.

Also, since the base material 71 is a linear flat plate, it is possible to increase the number of base materials 71 obtained from the metal plate. As a result, it is possible to increase a yield ratio. Since the second connecting terminal 80 and the first connecting terminal 70 have the same configuration, the same effects are also obtained by the second connecting terminal 80.

(3) The folded portion 75 of the first connecting terminal 70 is in contact with the outward projecting portion 73 in the axial direction, and thereby it is possible to achieve miniaturization of the portion of the first connecting terminal 70 in the axial direction, which projects toward outside in the radial direction than the stator core 41. Hence, it is possible to reduce a space in which the stator 40 is disposed in the electric actuator 20. In addition, it is possible to increase the strength of the portion of the first connecting terminal 70 which projects toward outside in the radial direction than the stator core 41. Hence, even when the first welding electrode F1 (refer to FIG. 5B) pressurizes the one side in the axial direction during the fusing of the joining portion 77 and the first end portion 42a of the drive coil 42, it is possible to reduce deformation of the portion of the first connecting terminals 70 toward the one side in the axial direction, the portion projecting toward outside in the radial direction than the stator core 41. Since the second connecting terminal 80 and the first connecting terminal 70 have the same disposition configuration with respect to the stator core 41, the same effects are also obtained by the second connecting terminal 80.

(4) The joining portion 77 of the first connecting terminal 70 is positioned close to the other side in the axial direction than the outward projecting portion 73, and thereby the joining portion 77 is positioned close to the other side in the axial direction than the end portion of the drive coil 42 on the one side in the axial direction and the end portion of the first insulator 61 on the one side in the axial direction. Hence, it is possible to achieve miniaturization of the stator 40 in the axial direction. Since the second connecting terminal 80 and the first connecting terminal 70 have the same configuration, the same effects are also obtained by the second connecting terminal 80.

(5) Since the joining portion 77 of the first connecting terminal 70 is positioned to overlap with the stator core 41 when viewed in the radial direction, the joining portion 77 is positioned close to the other side in the axial direction than the end portion of the drive coil 42 on the one side in the axial direction and the end portion of the first insulator 61 on the one side in the axial direction. Hence, it is possible to achieve miniaturization of the stator 40 in the axial direction. Since the joining portion 87 of the second connecting terminal 80 and the joining portion 77 of the first connecting terminal 70 have the same disposition configuration with respect to the stator core 41, the same effects are also obtained by the joining portion 87 of the second connecting terminal 80.

(6) The first portion 72a of the fixing portion 72 buried in the first insulator 61 extends toward outside in the radial direction, and thereby it is possible to fix the fixing portion 72 in the first insulator 61 even when the length of the fixing portion 72 buried in the first insulator 61 is shortened in the axial direction, compared to a structure in which the first connecting terminal is pressed to be fitted in a first insulator in the axial direction. Since the fixing portion 82 of the second connecting terminal 80 and the fixing portion 72 of the first connecting terminal 70 are buried in the first insulator 61 in the same manner, the same effects are also obtained by the fixing portion 82 of the second connecting terminal 80.

(7) The board connecting portion 78 is provided with the notch 78c, and thereby the base portion 78a and the connecting portion 78b are deformed in the axial direction via the notch 78c when a thermal shock or vibration is applied to the stator 40, for example. In this manner, a force is unlikely to be applied to a connection portion (solder portion) between the connecting portion 78b and the circuit board 25. Hence, it is possible to enhance the reliability of the electrical connection between the board connecting portion 78 and the circuit board 25.

Also, as illustrated in FIG. 7, the notch 78c is formed such that the board connecting portion 78 can be accommodated in the partial portion M1 of the mold M for performing the insert molding of the first insulator 61 and the first connecting terminal 70. In this manner, the reliability of the electrical connection between the board connecting portion 78 and the circuit board 25 is enhanced, and it is possible to perform the insert molding of the first insulator 61 and the first connecting terminals 70.

(8) The axial direction of the brushless motor 30 is disposed to be parallel to the vehicle width direction of the vehicle. Here, since the brushless motor 30 is reduced in size in the axial direction, it is possible to reduce the sliding door 1 in thickness in the vehicle width direction.

(9) The outward projecting portion 73 projects from the side surface of the first insulator 61 in the radial direction. Therefore, it is possible to simplify the shape of the first connecting terminal 70, compared to a structure in which the outward projecting portion 73 projects from an end surface of the first insulator 61 in the axial direction. Also, it is possible to reduce an amount of projection of the first insulator 61 on the outer side in the radial direction further than the stator core 41, compared to a structure in which the outward projecting portion 73 projects from the end surface of the first insulator 61 on the other side in the axial direction. Hence, it is possible to avoid interference of the first insulator 61 with the support 23a of the first housing member 23.

(10) The drawing-out groove 61a in which the first end portion 42a of the drive coil 42 is drawn outward in the radial direction is formed in the portion of the first insulator 61 which is adjacent in the circumferential direction to the first connecting terminal 70 at the center in the circumferential direction. In this manner, the first end portion 42a that is connected to the first connecting terminals 70 at the center in the circumferential direction is drawn to be adjacent to the first connecting terminal 70 in the circumferential direction. Therefore, it is possible to reduce a decrease of the space in which the support 23a is disposed.

Also, to the first connecting terminals 70 in both end portions in the circumferential direction, the first end portions 42a of the drive coil 42 are drawn about from the opposite side to the first connecting terminal 70 at the center in the circumferential direction. In this manner, since the first end portions 42a that are connected to the first connecting terminals 70 in both end portions are not positioned between the first connecting terminal 70 at the center and the first connecting terminals 70 adjacent to the first connecting terminal 70 at the center, it is possible to reduce a decrease of the space in which the support 23a of the first housing member 23 is disposed.

(11) The three first connecting terminals 70 have the same shape, and thereby it is possible to reduce manufacturing costs of the first connecting terminals 70. Hence, it is possible to reduce manufacturing cost of the brushless motor 30.

The embodiment described above may be modified as follows.

In the embodiment described above, the plurality of permanent magnets may be so-called segment magnets which are fixed to the outer circumferential surface of the rotor core 51. Also, the permanent magnet 52 may be molded integrally with the rotary shaft 31 by using a resin without using the rotor core 51.

In the embodiment described above, an embedded magnet structure in which the magnet is accommodated in a magnet accommodating portion formed in a portion of the rotor core 51 further inward in the radial direction than the outer circumferential surface of the rotor core 51 may be employed.

Figures 12A, 12B:
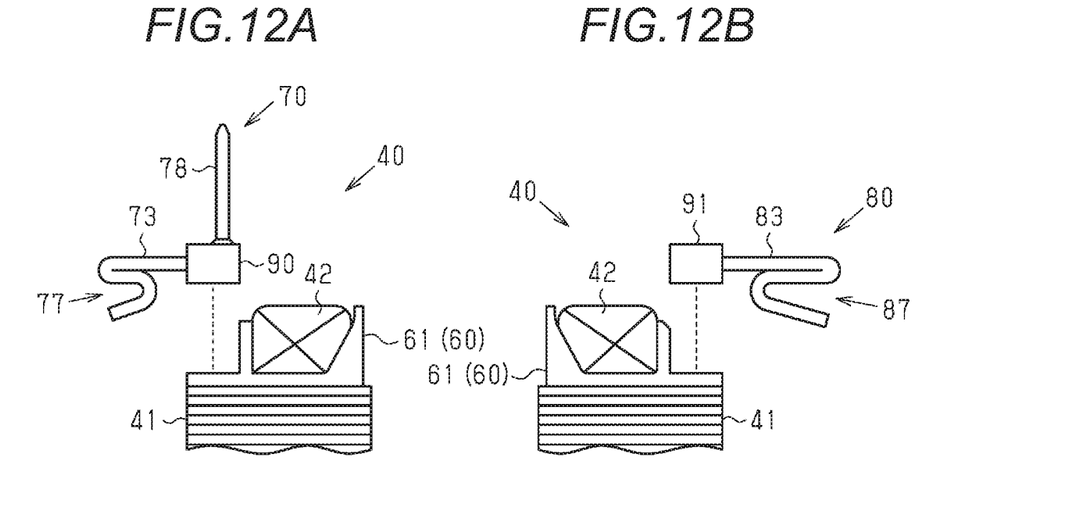
FIG. 12A is a side view of a first connecting terminal and a stator of a modification example.
FIG. 12B is a side view of a second connecting terminal and the stator of the modification example.

In the embodiment described above, a member formed separately from the first insulator 61 may be molded integrally with the first connecting terminals 70 and the second connecting terminal 80. For example, as illustrated in FIG. 12A, the first connecting terminals 70 are molded integrally with a terminal fixing base 90. Also, as illustrated in FIG. 12B, the second connecting terminal 80 is molded integrally with a terminal fixing base 91. The terminal fixing bases 90 and 91 are fixed to the first insulator 61 with a screw or an adhesive. In this manner, the terminal fixing bases 90 and 91 are indirectly attached to the end portion of the stator core 41 on the one side in the axial direction.

In the embodiment described above, one or two first connecting terminals 70 of the three first connecting terminals 70 may have a different structure from the first connecting terminals 70.

In the embodiment described above, the positions of the joining portion 77 of the first connecting terminal 70 and the joining portion 87 of the second connecting terminal 80 in the axial direction are optional setting items within a range close to the other side in the axial direction than the end portion of the first insulator 61 on the one side in the axial direction. For example, the joining portions 77 and the joining portion 87 may be positioned close to the one side in the axial direction than the stator core 41 when the stator 40 is viewed in the radial direction and may be positioned to overlap with the first insulator 61 in the radial direction. In short, the joining portions 77 of the first connecting terminals 70 and the joining portion 87 of the second connecting terminal 80 may not be positioned in a space between the first insulator 61 (stator core 41) and the circuit board 25 in the axial direction.

In the embodiment described above, the stator core 41 may be a curling core or a divided core.

In the embodiment described above, the conducting wires may be wound around all of the teeth 44. In this case, the first teeth 44A are provided instead of the second teeth 44B.

In the embodiment described above, the drive coil 42 may be formed of a conducting wire wound around through a plurality of teeth 44 in a distributed winding manner.

In the embodiment described above, instead of the drive coils 42 of three phases, the drive coils 42 of two phases or four phases may be used.

In the embodiment described above, instead of application of the brushless motor 30 to the drive source of the power sliding door apparatus, for example, the brushless motor 30 may be applied to a drive source of a back door, a luggage door, a trunk lid, or a power window provided in the rear of the vehicle.

A stator of a brushless motor according to an aspect of this disclosure includes: a stator core; a coil that is formed by winding a conducting wire around the stator core; a connecting terminal that is electrically connected to an end portion of the coil; and a terminal fixing base that has an electrical insulation property, is attached to an end portion of the stator core on one side in an axial direction thereof, and fixes the connecting terminal. The connecting terminal includes a fixing portion that is fixed to the terminal fixing base, an outward projecting portion that extends from the fixing portion toward outside in a radial direction than the stator core, and a joining portion that overlaps with the outward projecting portion in the axial direction and is positioned outside the stator core in the radial direction. The joining portion is opened outward in the radial direction.

In this configuration, the joining portion of the connecting terminal is positioned outside the stator core in the radial direction. In this manner, even when a circuit board is disposed on one side of the stator in the axial direction, the joining portion avoids being positioned between the stator core and the circuit board in the axial direction. Hence, it is possible to cause the circuit board to approach the stator in the axial direction, and thus it is possible to achieve miniaturization of the brushless motor in the axial direction. In addition, since the outward projecting portion and the joining portion overlap with each other when viewed in the axial direction, it is possible to achieve space saving in a circumferential direction of a portion of the connecting terminal which projects outward in the radial direction from the stator core. In addition, since the joining portion is opened outward in the radial direction, that is, since the joining portion is not opened inward in the radial direction, inward movement of the coil in the radial direction is limited when the end portion of the coil is joined to the joining portion. Hence, the end portion of the coil is caught in the joining portion, and thereby tension is applied to the end portion of the coil.

Therefore, it is possible to easily reduce an occurrence of loosening of the end portion of the coil. Hence, it is possible to easily join the end portion of the coil to the joining portion. The end portion of the coil is a winding-start end portion or a winding-finish end portion of the conducting wire to or from teeth, and the conducting wire forms the coil.

In the stator of a brushless motor, it is preferable that the connecting terminal is made of a flat plate-like plate and is further provided with a first bent portion that is bent from the outward projecting portion in a plate thickness direction and is folded inward in the radial direction, a folded portion that extends inward in the radial direction from the first bent portion, and a second bent portion that is bent from the folded portion in the plate thickness direction and is folded outward in the radial direction, and the joining portion is provided with a portion that extends toward outside in the radial direction from the second bent portion and is joined with an end portion of the coil between the folded portion and the joining portion.

With this configuration, the joining portion is formed on a surface of the connecting terminal that is orthogonal to a surface thereof in the plate thickness direction thereof, and thereby it is possible to obtain a large contact area between the end portion of the coil and the joining portion. Hence, it is possible to enhance the reliability of electrical connection between the end portion of the coil and the joining portion. In addition, since the outer side of the joining portion in the radial direction and both end portions thereof in the circumferential direction are opened, it is easy to insert the end portion of the coil which extends in the circumferential direction from the outer side of the joining portion in the radial direction. Hence, it is possible to more easily join the end portion of the coil to the joining portion.

In the stator of a brushless motor, it is preferable that the folded portion is in contact with the outward projecting portion in the axial direction.

With this configuration, it is possible to achieve miniaturization of the portion of the connecting terminal in the axial direction, which projects toward outside in the radial direction than the stator core. In addition, it is possible to increase the strength of the portion of the connecting terminal which projects toward outside in the radial direction than the stator core.

In the stator of a brushless motor, it is preferable that the joining portion is positioned close to the other side in the axial direction than the outward projecting portion.

With this configuration, since the joining portion is positioned close to the other side in the axial direction than an end portion of the coil on one side in the axial direction and an end portion of the terminal fixing base on one side in the axial direction, it is possible to achieve miniaturization of the stator in the axial direction.

In the stator of a brushless motor, it is preferable that the terminal fixing base is an insulator that electrically insulates the stator core and the coil, and the joining portion is positioned such that the insulator or the stator core overlaps with the joining portion when viewed in the radial direction.

With this configuration, since the joining portion is positioned close to the other side in the axial direction than the end portion of the coil on the one side in the axial direction and an end portion of the insulator on one side in the axial direction, it is possible to achieve miniaturization of the stator in the axial direction.

In the stator of a brushless motor, it is preferable that the terminal fixing base is an insulator that electrically insulates the stator core and the coil and is subjected to insert molding together with the connecting terminal, and the fixing portion is provided with a portion that is buried in the insulator and extends toward outside in the radial direction.

With this configuration, the fixing portion is provided with the portion that extends toward outside in the radial direction, and thereby it is possible to fix the fixing portion in the insulator even when the length of the fixing portion buried in the insulator is shortened in the axial direction, compared to a structure in which a fixing portion is pressed to be fitted in an insulator in the axial direction.

In the stator of a brushless motor, it is preferable that a circuit board is disposed on one side of the stator in the axial direction, and the connecting terminal is provided with a board connecting portion that is electrically connected to the circuit board, the board connecting portion extends from the fixing portion in the axial direction and projects from the terminal fixing base in the axial direction, and the board connecting portion is provided with a notch.

With this configuration, when a thermal shock or vibration is applied to the stator, the board connecting portion is deformed in the axial direction via the notch, and thereby a force is unlikely to be applied to a connection portion between the board connecting portion and the circuit board. Therefore, it is possible to enhance the reliability of the electrical connection between the board connecting portion and the circuit board.

A brushless motor according to an aspect of this disclosure includes: the stator of a brushless motor described above; and a circuit board that is disposed on one side of the stator in the axial direction.

With this configuration, since it is possible to reduce a gap between the stator and the circuit board in the axial direction, it is possible to achieve miniaturization of the brushless motor in the axial direction.

A power sliding door apparatus according to an aspect of this disclosure includes: the brushless motor described above as a drive source that actuates a sliding door of a vehicle to be opened and closed. The axial direction of the brushless motor is disposed to be parallel to a vehicle width direction of the vehicle.

With this configuration, since it is possible to achieve the miniaturization of the brushless motor in the axial direction, the axial direction of the brushless motor is disposed to be parallel to the vehicle width direction, and thereby it is possible to reduce the sliding door in thickness in the vehicle width direction.

According to the stator of a brushless motor, the brushless motor, and the power sliding door apparatus using the brushless motor, it is possible to achieve miniaturization of the brushless motor in an axial direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A stator of a brushless motor comprising:
   a stator core;
   a coil that is formed by winding a conducting wire around the stator core;
   a connecting terminal that is electrically connected to an end portion of the coil; and
   a terminal fixing base that has an electrical insulation property, is attached to an end portion of the stator core on one side in an axial direction thereof, and fixes the connecting terminal,
   wherein the connecting terminal includes
      a fixing portion that is fixed to the terminal fixing base,
      an outward projecting portion that extends from the fixing portion toward outside in a radial direction than the stator core, and
      a joining portion that overlaps with the outward projecting portion in the axial direction and is positioned outside the stator core in the radial direction, and
   the joining portion is opened outward in the radial direction.

2. The stator of a brushless motor according to claim 1, wherein the connecting terminal is made of a flat plate-like plate and is further provided with a first bent portion that is bent from the outward projecting portion in a plate thickness direction and is folded inward in the radial direction, a folded portion that extends inward in the radial direction from the first bent portion, and a second bent portion that is bent from the folded portion in the plate thickness direction and is folded outward in the radial direction, and
   the joining portion is provided with a portion that extends toward outside in the radial direction from the second bent portion and is joined with an end portion of the coil between the folded portion and the joining portion.

3. The stator of a brushless motor according to claim 2, wherein the folded portion is in contact with the outward projecting portion in the axial direction.

4. The stator of a brushless motor according to claim 1, wherein the joining portion is positioned close to the other side in the axial direction than the outward projecting portion.

5. The stator of a brushless motor according to claim 1, wherein the terminal fixing base is an insulator that electrically insulates the stator core and the coil, and
   the joining portion is positioned such that the insulator or the stator core overlaps with the joining portion when viewed in the radial direction.

6. The stator of a brushless motor according to claim 1, wherein the terminal fixing base is an insulator that electrically insulates the stator core and the coil and is subjected to insert molding together with the connecting terminal, and
   the fixing portion is provided with a portion that is buried in the insulator and extends toward outside in the radial direction.

7. The stator of a brushless motor according to claim 1, wherein a circuit board is disposed on one side of the stator in the axial direction,
   the connecting terminal is provided with a board connecting portion that is electrically connected to the circuit board,
   the board connecting portion extends from the fixing portion in the axial direction and projects from the terminal fixing base in the axial direction, and
   the board connecting portion is provided with a notch.

8. A brushless motor comprising:
   the stator of a brushless motor according to claim 1; and
   a circuit board that is disposed on one side of the stator in the axial direction.

9. A power sliding door apparatus comprising:
the brushless motor according to claim 8 as a drive source that actuates a sliding door of a vehicle to be opened and closed,
wherein the axial direction of the brushless motor is disposed to be parallel to a vehicle width direction of the vehicle.

* * * * *